April 19, 1932. A. Y. DODGE Re. 18,431

BRAKE

Original Filed Oct. 4, 1926

INVENTOR.
ADIEL Y. DODGE
BY A. R. McCrady
ATTORNEY

Reissued Apr. 19, 1932 Re. 18,431

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKE

Original No. 1,728,671, dated September 17, 1929, Serial No. 139,387, filed October 4, 1926. Application for reissue filed January 28, 1932. Serial No. 589,494.

This invention relates to brakes and is illustrated as embodied in an internal expanding automobile brake of the type in which one shoe anchors when the drum is turning in one direction and a different shoe anchors when the drum is turning in the opposite direction. An object of the invention is to provide novel positioning means, preferably automatically adjusted, for the connection between the shoes.

In one desirable embodiment, there is an automatic device positioning the connection along a radius of the drum and yielding means is provided for centering the connection at right angles to the radius. The automatic means may be in the form of a stop which is frictionally clamped in place, and which has a slot extending along a chord of the drum and engaging the connection.

The above and other objects and features of the invention, including various novel combination of parts and desirable particular construction, will be apparent from the following description of one illustrative embodiment shown in the accompanying drawings, in which.

Figure 1:
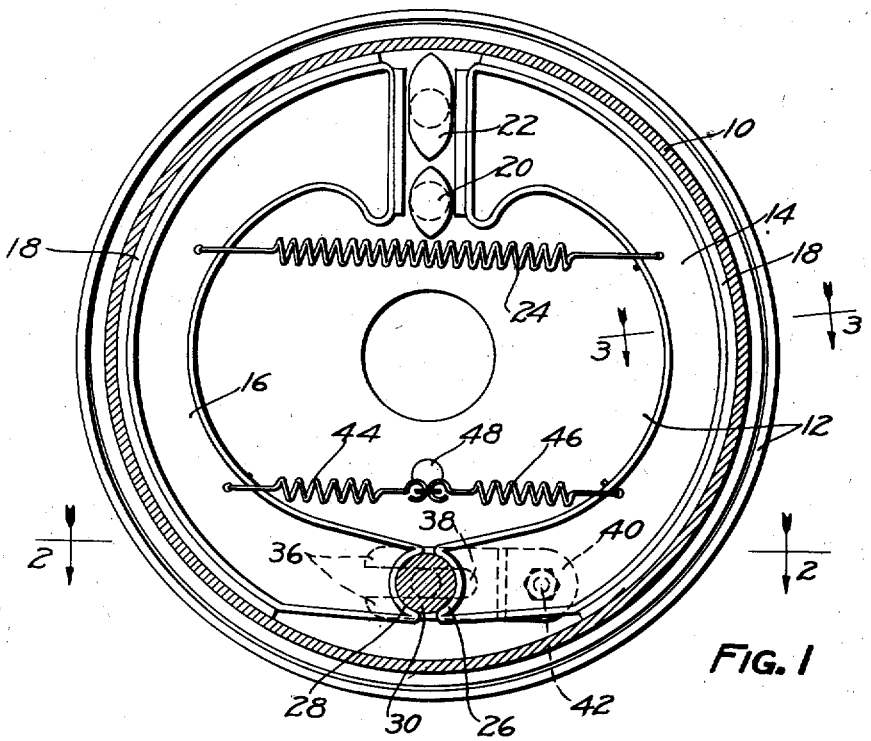
Figure 1 is a vertical section through the brake just inside the head of the brake drum and showing the shoes in side elevation.
Figure 2:
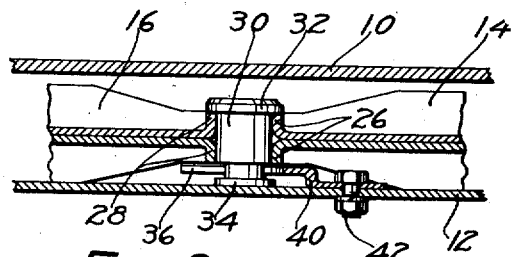
Figure 2 is a partial section on the line 2—2 of Figure 1 showing the automatic adjustment.
Figure 3:
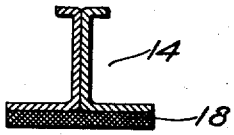
Figure 3 is a section through one of the shoes on the line 3—3 of Figure 1.

The brake illustrated includes a rotatable drum 10, at one side of which there is arranged a suitable backing plate or other support 12, and within which are arranged a plurality of floating brake shoes 14 and 16, each of which is shown as built up of two generally L-section stampings fastened back to back and directly supporting the brake lining 18. A stationary cam or other adjustable anchor 20 is arranged between the adjacent ends of shoes 14 and 16 and between the same ends there is arranged a floating double cam 22 which is arranged to force the shoes apart against the resistance of a return spring 24 to apply the brake. Cam 22 may if desired be mounted as shown in Patent No. 1,670,729 to allow it to float. For convenience of illustration, the shoes 14 and 16 are shown in engagement with the drum, although the cam 22 is shown in its "off" position. If the drum in Figure 1 were turning in a clockwise direction the shoe 16 would anchor against the stationary cam 20, whereas if the drum were turning in a counterclockwise direction the shoe 14 would anchor against the stationary cam.

At their ends opposite the cams 20 and 22 the stampings making up the shoes 14 and 16 are flanged to form semi-cylindrical bearings 26 and 28 for a floating pivot 30 having a head 32 confining the shoes against lateral movement on the side next the drum 10 and grooved at its opposite end to form an end flange 34 of the same diameter as the body of the pivot. The groove formed by the flange 34 is embraced by forked arms 36 forming a slot 38 equal in width to the grooved part of the pivot with substantially no clearance. The arms 36 are formed as parts of a stamping 40 frictionally clamped to resist angular movement by a bolt 42 passing through the backing plate 12. The pivot 30 is centered in the slot 38, with the shoes 14 and 16 equally spaced from the drum 10, when the brake is released, by balanced springs 44 and 46 secured to the two shoes and to a stationary bracket 48 carried by the backing plate.

In the operation of the brake, the slot 38, when the brake lining 18 is new, is substantially perpendicular to the vertical diameter of the drum 10. When cam 22 is rotated to apply the brake, both shoes pivot outwardly about pivot 30 which moves downwardly until both shoes are in engagement with the drum over their entire lengths. When the brake is released, pivot 30 remains substantially fixed, the pivotal movement of the shoes inwardly about pivot 30 being sufficient to move them clear of the drum. As the lining wears, the successive applications of the brake (which are practically all in the same direction) gradually force the stamping 40 angularly downward to adjust the radial position of the pivot 30 to compensate for the wear of the lining. The wear of the lining is small enough taken with the relatively small movements of the shoes 14 and 16, and the considerable length of member 40, so that the slot 38 remains substantially horizontal. It is, of course, not exactly horizontal after several adjustments, and theoretically each time the brake is applied when the automobile is moving backward the member 40 will be shifted a little too far downward, but this will be corrected on the next application of the brake when the automobile is moving in a forward direction.

While one illustrative embodiment has been described in detail, it is not my intention to limit the scope of the invention to that particular embodiment, or otherwise than by the terms of the appended claims.

I claim:

1. A brake comprising, in combination, a drum, a plurality of shoes having a pivotal connection and anchoring on one shoe when the drum is turning in one direction and on a different shoe when the drum is turning in the other direction, a positioning device having a slot extending along a chord of the drum and engaging said connection, and balanced springs engaging the shoes on opposite sides of the connection and urging the connection to the center of the slot.

2. A brake comprising, in combination, a drum, a plurality of shoes having a pivotal connection and anchoring on one shoe when the drum is turning in one direction and on a different shoe when the drum is turning in the other direction, a positioning device forked at one end to form a slot extending along a chord of the drum and engaging said connection, and balanced springs engaging the shoes on opposite sides of the connection and urging the connection to the center of the slot.

3. A brake comprising, in combination, a drum, a plurality of shoes arranged to anchor on one shoe when the drum is turning in one direction and on a different shoe when the drum is turning in a different direction, a pivot connecting the shoes and formed with a groove at one end, and a positioning device having a slot extending along a chord of the drum and straddling the grooved part of the pivot and acting through the pivot to position the shoes laterally as well as radially of the drum.

4. A brake comprising, in combination, a drum, a plurality of connected shoes anchoring on one shoe when the drum is turning in one direction and on a different shoe when the drum is turning in the other direction, and a device determining the idle position of the connected ends of the shoes and which is automatically adjusted substantially radially of the drum by the application of the brake to adjust the clearance of the shoes with respect to the drum as the brake wears.

5. A brake comprising, in combination, a drum, a plurality of connected shoes anchoring on one shoe when the drum is turning in one direction and on a different shoe when the drum is turning in the other direction, and a device determining the idle position of the connected ends of the shoes radially with respect to the drum and which is automatically adjusted by the application of the brake to shift the assembly of shoes bodily toward the drum as the brake wears.

6. A brake comprising, in combination, a drum, a friction device engageable with the the drum, means determining the idle position of a part of the brake along a radius of the drum and adjusted automatically, as the brake wears, by the application of the brake, and yielding means for centering said part at right angles to said radius.

7. A brake comprising, in combination, a drum, a friction device engageable with the drum, means for expanding said device against the drum, means opposite the expanding means determining the idle position of an intermediate part of the brake along a radius of the drum and adjusted automatically, as the brake wears, by the application of the brake, and yielding means for centering said part at right angles to said radius.

8. A brake comprising, in combination, a drum, a plurality of shoes having a connection and anchoring on one shoe when the drum is turning in one direction and on a different shoe when the drum is turning in the other direction, means determining the idle position of said connection along a radius of the drum and adjusted automatically by application of the brake to compensate for wear of the brake, and means for yieldingly centering the connection at right angles to said radius.

9. A brake comprising, in combination, a drum, a plurality of shoes having a connection and anchoring on one shoe when the drum is turning in one direction and on a different shoe when the drum is turning in the other direction, a frictionally-clamped device determining the idle position of said connection along a radius of the drum and adjusted automatically by application of the brake to compensate for wear of the brake, and means for yieldingly centering the connection at right angles to said radius.

10. A brake comprising, in combination, a friction device having a projecting part, a frictionally-clamped member having a slot closely embracing said part substantially without clearance and automatically shifted as the brake wears by movement of said part crosswise of the slot, and means for determining the idle position of said part in the slot.

11. A brake comprising, in combination, a drum, a friction device having a projecting part, and a frictionally-clamped member having a slot extending along a chord of the drum and embracing said part substantially without clearance and automatically shifted as the brake wears by movement of said part crosswise of the slot.

12. A brake comprising, in combination, a drum, a plurality of shoes engageable with the drum and having a connecting part and a frictionally-clamped positioning member having a slot extending along a chord of the drum and embracing said part substantially without clearance and automatically shifted by said part during application of the brake to compensate for wear of the brake.

13. A brake comprising, in combination, a drum, a plurality of shoes engageable with the drum and having a connecting part and anchoring on one shoe when the drum is turning in one direction and on another shoe when the drum is turning in the other direction, and a frictionally-clamped positioning member engaging said part and automatically shifted by said part during application of the brake to compensate for wear of the brake.

14. A brake comprising, in combination, a friction device having a laterally-extending part, and a guide having a slot embracing said part substantially without clearance and extending generally along a chord of the friction device.

15. A brake comprising, in combination, a friction device having a laterally-extending part, a guide having a slot embracing said part substantially without clearance and extending generally along a chord of the friction device, and means for clamping said guide in the position to which it is moved by said part in applying the brake.

16. A brake comprising, in combination, a drum, a friction device engageable with the drum, and guiding means for the friction device including two parts, one moving with the friction device and the other normally stationary and one of which is slotted generally along a chord of the drum to embrace the other substantially without clearance, together with means to clamp the slotted part in any position to which it is moved by the other part in applying the brake.

In witness whereof, I hereunto subscribe my name this 25th day of January, A. D. 1932.

ADIEL Y. DODGE.